UNITED STATES PATENT OFFICE 2,651,651

SILICON HALIDES CONTAINING FLUOROCARBON RADICALS

Joseph H. Simons and Robert D. Dunlap, State College, Pa., assignors to Minnesota Mining & Manufacturing Company, St. Paul, Minn., a corporation of Delaware No Drawing. Application May 4, 1949, Serial No. 91,423

4 Claims. (Cl. 260—448.2)

This invention is primarily concerned with compounds containing only carbon, silicon and halogen, in which one or more fluorocarbon radicals are attached to silicon. Included within this category, and of particular interest, are compounds having both fluorocarbon radicals and halogen atoms attached to silicon, i. e., compounds in which from one to three fluorocarbon radicals and correspondingly from three to one halogen atoms, and more specifically fluorine atoms, are attached to silicon. One such compound is $C_4F_9SiF_3$, nonafluorobutyl trifluorosilane. The invention broadly contemplates these carbon-silicon-halogen compounds, derivatives and polymerization products thereof, and methods of making the same.

The fluorocarbons, compounds containing only carbon and fluorine, are distinguished by their extreme inertness. For example, only such active reagents as hot metallic sodium and the like are capable of attacking the bond between carbon and fluorine. Because of this characteristic, various gaseous, liquid and solid fluorocarbons have been found valuable as heat transfer media, dilution media, gaskets, lubricants, and for other purposes where high chemical and temperature stability are required. At the same time, this lack of reactivity has retarded the development of applications of the fluorocarbons in many directions.

The novel compounds of the present invention are similar to the fluorocarbons in a number of respects, but significantly are quite different in regard to their reactivity. Whereas the carbon-fluorine bond is exceedingly stable, the silicon-fluorine bond is found to be quite reactive, making possible the preparation of various derivatives, polymers, and other reaction products having desirable properties.

Prior to our invention, so far as we are aware no one has ever succeeded in producing compounds containing only carbon, silicon and halogen and having fluorocarbon radicals attached to silicon, such as we have now been able to provide. On the other hand, many investigators have produced compounds, such as methyl trichlorosilane and the like, in which hydrocarbon radicals and halogen atoms are attached to silicon, and which may be considered as having an equivalent structure.

A number of routes for the preparation of alkyl silanes, alkoxysilanes, and halosilanes are described in Rochow's book, "Chemistry of the Silicones," in the chapter entitled "The organosilicon monomers." However, in the light of available knowledge of the fluorocarbons, it would not be anticipated that these routes would be applicable to the preparation of our novel class of compounds. Actually, the routes by which we have obtained the desired novel products of our invention are quite distinct from, and entirely unsuggested by the disclosures of prior art known to us.

One preferred prior art method for the preparation of alkyl silanes involved the Grignard reaction, resulting in compounds such as $CH_3SiCl_3$, $(CH_3)_2SiCl_2$ and the like. However, at least prior to the present invention there was no evidence that a Grignard alpha to a fluorinated group, i. e. having the structure $RCF_2MgX$, could be prepared. Hence the Grignard reaction was not available for the preparation of silicon-substituted fluorocarbons. Other methods for the preparation of alkyl silanes depended on reactions involving substituted-hydrocarbon reactants of a type or types having no known counterparts in the fluorocarbon field; and hence these reactions were equally unavailable. A more recent preparation, the direct synthesis of organosilicon chlorides from silicon and alkyl chlorides, apparently involves a splitting of the carbon-chlorine linkage; the greatly increased stability of the carbon-fluorine bond over that of the carbon-chlorine bond would be expected to make such a method of preparation impossible in the case of the fluorocarbon starting materials.

Hence, although it was early recognized that fluorocarbon compounds having a reactive grouping would provide highly desirable properties, there was available no known recognized method for the preparation of the specific variety of reactive fluorocarbon type compounds of the instant invention.

Accordingly, one salient object of our invention is to provide hitherto unavailable and unknown chemical compounds and compositions. A related object is to provide compounds containing only carbon, fluorine and silicon. Another object is the provision of compounds of carbon, fluorine and silicon having hydrolyzable silicon-fluorine bonds and being capable of conversion to hydrolysis products and other derivative products. A further and specific object is the provision of compounds of carbon, halogen and silicon having one or more fluorocarbon radicals attached to a silicon atom carrying one or more hydrolyzable halogen atoms, particularly fluorine atoms. A still further object of the invention is the provision of fluorocarbon molecules and particularly of higher molecular weight fluorocarbon molecules, in which an atom of carbon has been replaced by an atom of silicon.

More specific objects are the provision of new compounds of the class represented by $R_nSiF_{4-n}$ where R represents a radical or radicals, not necessarily the same, consisting of carbon and fluorine, e. g. fluoroalkyl radicals, and $n$ is 1, 2 or 3.

The invention further contemplates derivative products, e. g. hydrolysis products and polymeric products derived therefrom, of these reactive compounds of carbon, fluorine and silicon. Other objects will appear as the description proceeds.

Exemplary methods for the preparation of the novel compounds of this invention will now be described, but with no intent to limit the invention thereto.

Example 1

Mixtures of fluorine and silicon tetrafluoride in gaseous form were found to react with calcium carbide at elevated temperatures, yielding a product mixture which on analysis was found to include compounds containing only carbon, fluorine and silicon.

The reaction was carried out in a ¾ inch iron pipe heated in a "Hoskins" electric furnace. The heated portion of the pipe was packed with about 85–90 grams of coarse granular calcium carbide. Fluorine at approximately 50 cc. per minute, and silicon tetrafluoride at about 250 cc. per minute, were premixed and fed into one end of the reactor, the system being closed to the atmosphere. The exit gases were condensed and the liquid products collected in traps cooled with solid carbon dioxide in acetone and with liquid air. The reactor was held at 300° C., at which temperature the volume of exit gas was at a minimum, indicating that the most favorable reaction conditions were obtained.

Of the condensate, 23% was found to boil below room temperature, and was shown to consist of fluorocarbons containing 1, 2, 3, 4 and 5 carbon atoms, with a slight contamination of silicon tetrafluoride.

The remaining material was charged to a precision fractionating column and distilled. The results are shown in the table.

| Fraction | Boiling Range, °C. | Wt. percent of charge |
| --- | --- | --- |
| 1 | 24–40 | 6.2 |
| 2 | 40–47 | 5.1 |
| 3 | 47–50 | 6.2 |
| 4 | 50–55 | 4.5 |
| 5 | 55–73 | 7.3 |
| 6 | 73–82 | 5.6 |
| 7 | 82–103 | 6.5 |
| 8 | 103–108 | 3.4 |
| 9 | 57–80 (120 mm.) | 8.9 |
| 10 | 80–94 (120 mm.) | 5.2 |
| 11 | 94–101 (120 mm.) | 3.6 |
| 12 | 67–79 (30 mm.) | 3.4 |
| 13 | 79–81 (30 mm.) | 3.4 |
| 14 | 165–210 (25 mm.) | 9.0 |
| Residue |  | 21.5 |

Examination showed these fractions to be complex mixtures of compounds containing only carbon, fluorine and silicon. Qualitative tests for the three elements were obtained by fusion with sodium and with sodium peroxide by standard techniques.

These fractions are readily differentiated from the fluorocarbons, compounds of carbon and fluorine, boiling at about the same temperature. The molecular weights are lower. The fractions are acid to moist litmus paper, and in water slowly hydrolyze to give polymers. The hydrolysis demonstrates the presence of fluorine bound to silicon.

When silicon tetrafluoride alone was passed over the heated calcium carbide, a carbon-free product was obtained, which at room temperature decomposed to silicon and silicon tetrafluoride. No carbon-containing compounds were produced.

Fluorine was also tried as the sole reactant for the heated calcium carbide. The gas was premixed with a stream of nitrogen as an inert carrier. A condensate was recovered, but was found to be quite different from that obtained with the combined fluorine and silicon tetrafluoride. Only 33% (rather than 77% as in the other reaction) of the condensate boiled above room temperature, and this normally liquid portion was found to be a mixture of $C_5$ and $C_6$ fluorocarbons.

Of the fractions obtained in Example 1, the fraction boiling at 47° C. was found to have a molecular weight of 302–304, and as previously noted was acid to moist litmus and contained only carbon, fluorine and silicon. These properties establish the material as consisting mainly of compounds of carbon, fluorine and silicon having fluorine atoms attached to both carbon and silicon atoms and having the empirical formula $C_4SiF_{12}$. Included in the mixture of compounds is nonafluorobutyl trifluorosilane $C_4F_9SiF_3$.

As a probable explanation of the results obtained, it is suggested that fluorine reacts with calcium carbide, under the conditions described, to produce calcium fluoride and an unstable carbon fragment with fewer than the number of fluorine atoms required for stability attached thereto. In the presence only of free fluorine or of other similar fragments, combination results in stable fluorocarbon products. However, when silicon tetrafluoride is present in high proportion, reaction occurs between that compound and the unstable carbon fragments, producing a complex series of silicon-carbon-fluorine molecules. The combination of the reactive fluorocarbon fragments with each other and with silicon tetrafluoride produces compounds such as $R_4Si$, where the R groups contain only carbon and fluorine and may be of relatively high molecular weight. Compounds with one, two, or three fluorine atoms remaining directly attached to silicon are also formed.

It is clear from the experimental evidence that such a series of compounds is actually produced and made available by the invention herein described. The individual component compounds may be isolated from the mixture by known methods, e. g. by adequate distillation of a large sample as in the isolation of components of similarly complex petroleum products.

Example 2

Bromotrifluoromethane was found to react with copper-silicon alloy at elevated temperatures in a closed system, with the formation of a large number of products.

The alloy was prepared by mixing together 182.2 grams of silicon powder and 31.1 grams of powdered cuprous chloride in an atmosphere of carbon dioxide provided by adding a lump of Dry Ice to the loosely stoppered container, and heating the contents at 295° C. for approximately two hours, until no further fumes were visible when moist air was blown past the container exit. About 100 grams of the resulting powder was placed in a "Pyrex" glass tube, one inch outside diameter and 20 inches long, and was held in place along the central portion of the tube by means of loose-fitting plugs of glass wool. The tube was heated along the central portion by a "Hoskins" electric furnace, and the temperature was determined by means of a thermocouple placed between the glass tube and the closely-fitting furnace lining.

Bromotrifluoromethane, $CF_3Br$, formed by bromination of trifluoromethane at elevated temperature and stored in a pressure vessel, was introduced into the reactor tube through a sulfuric acid bubbler at a rate of approximately one liter per hour. The volatile products from the reactor tube were collected in two traps, cooled respectively with Dry Ice and with liquid air as in Example 1.

Several preliminary runs were made to determine the optimum temperature conditions, using the apparatus and reactants described above. In a first trial, the temperature was maintained at 300° C. for one hour, then at 350° C. for one hour. In a second trial, made the following day, the temperature was held at 300° C. for 2 hours, taken to 450° C. in 2 hours and held at that temperature for one hour, and finally taken to 500° C. and held for one hour. The following day the reactor was operated for 7 hours at 500° C. The volatile products obtained at each temperature level were collected and tested. No reaction occurred at 300° C., unreacted $CF_3Br$ being recovered. At 500° C., all of the fluorine appeared as $SiF_4$. At the intermediate temperatures, some unreacted $CF_3Br$ and some $SiF_4$ were recovered, and in addition there was obtained a material containing carbon, silicon and fluorine, a portion of the fluorine being hydrolyzable. Further runs were therefore made at a temperature of 400° C., with the results described below.

The product obtained in the Dry Ice-acetone trap during two separate operating periods of 7 hours and 4 hours respectively was fractionated. In addition to a small amount of silicon-containing material boiling from −4° C. to 10° C. and a small silicon-containing residue in the still, there was obtained a major fraction boiling at −42° C. This fraction was found to have a molecular weight of 153. A portion was treated with tenth-normal sodium hydroxide solution, whereupon a white siliceous precipitate was formed. Three equivalents of base were neutralized per mole of the product. Tests for bromine were negative.

These properties identify the major reaction product as trifluoromethyltrifluorosilane, $CF_3SiF_3$.

Example 3

In a similar way, bromopentafluoroethane was passed at a rate of one liter per hour over the copper-silicon alloy at 400–500° C. Upon distillation of the product collected in the Dry Ice-acetone trap, four approximately equal fractions were obtained, having the following properties:

| Fraction | Boiling Range, °C. | Average mol. wt. | Equiv. wt. |
|---|---|---|---|
| 1 | −50 to −47 | 145 | 74 |
| 2 | −39 to −18 | 195 | 870 |
| 3 | −15 to 0 | 200 | 383 |
| 4 | 0 to 20 | 222 | 97 |

These properties, taken in conjunction with the method of preparation of the material, serve to identify the several fractions as follows: Fraction 1 contains a major proportion of trifluoromethyl trifluorosilane, $CF_3SiF_3$; Fractions 2 and 3 comprise mixtures of fluorocarbons and reactive silicon-containing analogues thereof; Fraction 4 consists mainly of a mixture of reactive compounds of carbon, silicon and fluorine, wherein fluorine atoms are attached to carbon atoms and to silicon atoms, including compounds of formula $C_2SiF_8$ and $C_3SiF_{10}$.

Example 4

Copper-silicon alloy, prepared as in Example 2, was preliminarily heated at 600° C. for 7 hours in a stream of nitrogen. With the temperature reduced to 400° C., bromotrifluoromethane was passed into the reactor at a rate of 2 liters per hour. In addition to silicon tetrafluoride and compounds containing only carbon, fluorine and silicon, there were obtained compounds containing carbon, fluorine, bromine and silicon. Included in this latter group was trifluoromethyl bromodifluorosilane, $CF_3SiF_2Br$, obtained as a major proportion of a fraction of the reaction products boiling at about 12–13° C., having a molecular weight of 200 and an equivalent weight of 67. The products of alkaline hydrolysis of this fraction gave a precipitate with acidic silver nitrate.

The formation by a direct method of compounds in which silicon is attached both to fluorocarbon radicals and to halogen atoms other than fluorine is shown by the above example. Another way in which such compounds can be made is by the direct replacement by other halogens of fluorine atoms attached to silicon, for example by treatment in known manner with aluminum chloride or aluminum bromide. This further demonstrates the reactivity of the silicon-fluorine bond.

The above examples illustrate the direct formation of simple compounds of carbon, halogen, and silicon in which silicon is attached to fluorocarbon radicals, and particularly those reactive compounds in which silicon is also directly attached to halogen atoms. In addition to these low-boiling and relatively simple compounds, there were also obtained in these and analogous examples, higher boiling high molecular weight materials which contained only carbon, fluorine and silicon.

Alloys of copper and silicon prepared as above described have given good results with fluorocarbon halides such as bromotrifluoromethane. Silver has also been found useful, in place of copper, as a catalyst for the reaction.

Compounds such as trifluoromethyl trifluorosilane and analogous silicon compounds containing both fluorocarbon radicals and fluorine or other halogen attached to silicon provide a basis for the preparation of valuable polymeric materials having high stability and chemical inertness, and these particular classes of compounds are accordingly of major importance. For example, the trifluorosilanes containing one fluorocarbon radical attached to the silicon atom may be hydrolyzed and condensed to yield hard resinous polymers. The difluorosilanes, containing two fluorocarbon radicals attached to the silicon atom, when similarly reacted, produce linear polymers. In these polymerizations, hydrolysis and condensation result in the formation of silicon-oxygen-silicon linkages.

Replacement of all of the fluorine atoms on the silicon atom to produce compounds of the type $R_4Si$ where the R groups represent fluorocarbon radicals is also accomplished in accordance with the disclosures hereinabove.

Many other classes of compounds of carbon, silicon and halogen in which silicon is attached to fluorocarbon radicals and forms usually a quite minor proportion of the total molecular weight of the compound may also be formed e. g. by substitution of other fluorocarbon bromides or analogous reactants for the bromotrifluoromethane of Example 2. One or more silicon atoms having its remaining valences attached to halogen, e. g. fluorine, may be attached to saturated, unsaturated, cyclic, or aromatic fluorocarbon radicals, or may be combined with fluorocarbon radicals to form fluorinated heterocyclic (C—Si) ring structures. The products may be solid, liquid or gaseous under normal conditions of temperature and pressure.

Compounds of carbon, silicon and halogen in which the carbon is all present in the form of fluorocarbon radicals, such as have herein been identified, are seen to have many desirable properties, and are useful for a variety of purposes. Those having both fluorocarbon radicals and halogen atoms attached to silicon are of particular utility. They are stable at high temperatures in the absence of moisture, and in the liquid state have desirable high fluidity, high density and low surface tension. Under proper conditions they react to form polymeric materials having desirable heat and oxidation resistance as well as other useful characteristics, as hereinbefore noted. They may be made to serve as surface-treating agents and as chemical intermediates. These and other desirable characteristics of these novel products are based on the presence of a hydrolyzable halogen-silicon bond such as a fluorine-silicon bond, and particularly a trifluorosilane radical, in compounds which may primarily be considered as fluorocarbons.

Having described various embodiments of the invention, for purposes of illustration rather than limitation, what we claim is as follows:

1. Chemical compounds having the formula $$(C_nF_{2n+1})_mSiX_{4-m}$$

where X is halogen, $n$ is an integer and $m$ is an integer from one to three.

2. Chemical compounds having the formula $$(C_nF_{2n+1})_mSiF_{4-m}$$

where $n$ is an integer and $m$ is an integer from one to three.

3. Chemical compounds having the formula $$(C_nF_{2n+1})SiF_3$$

4. Trifluoromethyl trifluorosilane.

JOSEPH H. SIMONS.
ROBERT D. DUNLAP.

References Cited in the file of this patent
UNITED STATES PATENTS

| Number | Name | Date |
| --- | --- | --- |
| 2,449,335 | Sowa | Sept. 12, 1948 |
| 2,478,493 | Levine | Aug. 9, 1949 |
| 2,510,149 | Speier | June 6, 1950 |